United States Patent
Hasegawa (10) Patent No.: US 10,569,749 B2
(45) Date of Patent: Feb. 25, 2020

(54) BRAKE CONTROL DEVICE FOR VEHICLES WITH BAR HANDLE

(71) Applicant: NISSIN KOGYO CO., LTD., Tomi, Nagano (JP)

(72) Inventor: Tetsuya Hasegawa, Tomi (JP)

(73) Assignee: NISSIN KOGYO CO., LTD., Nagano (JP)

( * ) Notice: Subject to any disclaimer, the term of this patent is extended or adjusted under 35 U.S.C. 154(b) by 177 days.

(21) Appl. No.: 15/919,663

(22) Filed: Mar. 13, 2018

(65) Prior Publication Data

US 2018/0265056 A1 Sep. 20, 2018

(30) Foreign Application Priority Data

Mar. 14, 2017 (JP) .................. 2017-048870

(51) Int. Cl.
| | |
|---|---|
| *B60T 8/17* | (2006.01) |
| *B60T 8/176* | (2006.01) |
| *B60T 8/1755* | (2006.01) |
| *B60T 8/171* | (2006.01) |
| *B60T 8/32* | (2006.01) |

(Continued)

(52) U.S. Cl.
CPC ............. *B60T 8/1706* (2013.01); *B60T 7/12* (2013.01); *B60T 8/171* (2013.01); *B60T 8/172* (2013.01); *B60T 8/176* (2013.01); *B60T 8/1755* (2013.01); *B60T 8/3225* (2013.01); *B60T 2201/16* (2013.01); *B60T 2230/00* (2013.01); *B60T 2250/04* (2013.01); *B60T 2270/10* (2013.01); *B60T 2270/30* (2013.01)

(58) Field of Classification Search
CPC ................ B60T 2250/04; B60T 17/14; B60W 30/18145; B60G 2400/204; B60G 2800/24

See application file for complete search history.

(56) References Cited

U.S. PATENT DOCUMENTS

| | | | |
|---|---|---|---|
| 4,989,922 | A | 2/1991 | Pickenhahn et al. |
| 5,286,097 | A | 2/1994 | Myoi et al. |
| 2017/0089939 | A1 | 3/2017 | Azuma et al. |

FOREIGN PATENT DOCUMENTS

| | | |
|---|---|---|
| EP | 0370469 | 5/1990 |
| EP | 2944526 | 11/2015 |
| JP | 2620995 | 6/1997 |

OTHER PUBLICATIONS

European Search Report for EP application No. 18161719.2-1012 dated Sep. 6, 2018, 5 pages.

*Primary Examiner* — Alan D Hutchinson
*Assistant Examiner* — Sahar Motazedi
(74) *Attorney, Agent, or Firm* — Andrew M. Calderon; Roberts Mlotkowski Safran Cole & Calderon, P.C.

(57) ABSTRACT

A brake control device for vehicles with bar handle includes: a wheel speed obtaining unit obtaining a speed of a wheel; an estimated vehicle body speed setting unit setting an estimated vehicle body speed; a control unit performing fluid pressure control to raise, reduce or hold a brake fluid pressure; and a bank angle obtaining unit obtaining a bank angle. The estimated vehicle body setting unit sets a limit value of a change amount when the estimated vehicle body speed decreases at a time of braking of the vehicle, and sets the estimated vehicle body speed based on the limit value when a deceleration amount of the speed of the wheel on a braked side is larger than the limit value, and the estimated vehicle body speed setting unit corrects the limit value so that the change amount decreases as the obtained bank angle increases.

4 Claims, 9 Drawing Sheets

(51) Int. Cl.
*B60T 7/12* (2006.01)
*B60T 8/172* (2006.01)

BRAKE CONTROL DEVICE FOR VEHICLES WITH BAR HANDLE

CROSS-REFERENCE TO RELATED APPLICATION

This application claims priority from Japanese Patent Application No. 2017-048870, filed on Mar. 14, 2017, the entire subject matter of which is incorporated herein by reference.

TECHNICAL FIELD

The present invention relates to a brake control device for vehicles with bar handle that controls braking of a vehicle with bar handle.

BACKGROUND

In vehicles with bar handle such as a motorcycle (hereinafter, also referred to merely as vehicle), fluid pressure control to reduce, raise or hold the brake fluid pressure by a brake control device for vehicles with bar handle is performed. Examples of the fluid pressure control include ABS (antilock-braking-system) control to suppress a slip of a wheel at the time of braking of the vehicle. In the system disclosed in Japanese Patent No. 2620995, when the inclined attitude angle (bank angle) of a motorcycle is larger than or equal to a predetermined threshold value, holding control to hold the braking pressure of the wheel before the lock pressure of the wheel is reached is performed as the ABS control.

At the time of fluid pressure control, the slip ratio of the wheel is calculated by using the estimated vehicle body speed estimated from the wheel speed, and appropriate processing is performed based on this slip ratio. This estimated vehicle body speed is, for example as disclosed in Japanese Patent No. 2620995, calculated by using the vehicle body deceleration obtained from the time course of the wheel speed when a shift occurs from acceleration to deceleration.

In the vehicles with bar handle, there are cases where when a brake operation is performed at the time of cornering, the estimated vehicle body speed of the vehicle body in the inclined state is calculated by applying a preset constant deceleration similarly to the straightly traveling state. For this reason, in the cornering state, there is a possibility that a difference occurs between the actual vehicle body speed and the estimated vehicle body speed and this affects the execution of the ABS control. That is, in the vehicles with bar handle, it is desired to more accurately calculate the estimated vehicle body speed according to the cornering state.

SUMMARY

The present invention is made in view of the above-mentioned circumstances, and an object thereof is to provide a brake control device for vehicles with bar handle capable of more excellently performing the fluid pressure control by accurately calculating the estimated vehicle body speed according to the bank angle at the time of cornering.

According to an aspect of the invention, there is provided a brake control device for vehicles with bar handle, the brake control device comprising: a wheel speed obtaining unit which is configured to obtain a speed of a wheel of the vehicle; an estimated vehicle body speed setting unit which is configured to set an estimated vehicle body speed based on the speed of the wheel; a control unit which is configured to perform fluid pressure control to raise, reduce or hold a brake fluid pressure that acts on a wheel brake of the vehicle based on the speed of the wheel and the estimated vehicle body speed; and a bank angle obtaining unit which is configured to obtain a bank angle of the vehicle, wherein the estimated vehicle body setting unit is configured to set a limit value of a change amount when the estimated vehicle body speed decreases at a time of braking of the vehicle, and set the estimated vehicle body speed based on the limit value when a deceleration amount of the speed of the wheel on a braked side is larger than the limit value, and the estimated vehicle body speed setting unit is configured to correct the limit value so that the change amount decreases as the obtained bank angle increases.

DETAILED DESCRIPTION

Hereinafter, citing a preferred embodiment, a brake control device for vehicles with bar handle according to the present invention will be described in detail with reference to the attached drawings.

Figure 1:
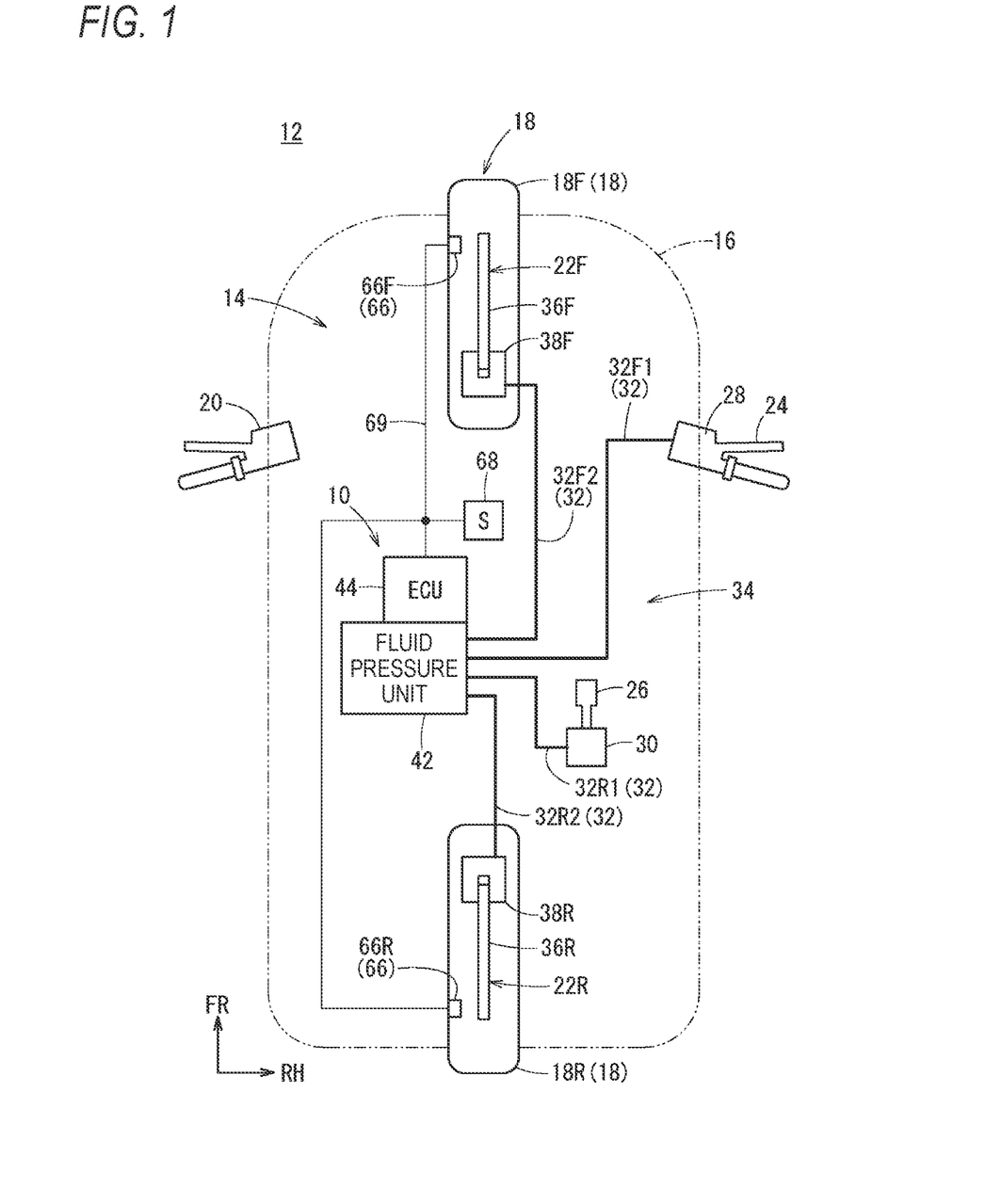
FIG. 1 is a schematic structural view of a vehicle with bar handle mounted with a brake control device for vehicles with bar handle according to an embodiment of the present invention.

As shown in FIG. 1, a brake control device 10 according to the embodiment of the present invention is mounted on a vehicle with bar handle 12, and controls the operation of a brake system 14 (wheel brake). Hereinafter, for convenience of explanation, the brake control device 10 will be referred to merely as control device 10. Moreover, as the vehicle with bar handle 12 (vehicle 12), a motorcycle, a motor tricycle and the like are cited, and in the following, description will be given with a motorcycle as an example.

The control device 10 performs the fluid pressure control (reduction, raising or holding of the brake fluid pressure) as required. For example, the fluid pressure control includes the ABS control to suppress a slip of a wheel 18 at the time of braking.

In particular, the control device 10 according to the present embodiment improves the stability of the vehicle 12 in the cornering state by making it possible to highly accurately calculate the estimated vehicle body speed used for the execution of the fluid pressure control when a brake operation is performed by the driver during cornering of the vehicle 12. In the following, for the facilitation of understanding of this control device 10, first, the vehicle 12 and the brake system 14 will be described.

The vehicle 12 is provided with a vehicle body 16 and the wheel 18 (a front wheel 18F, a rear wheel 18R). The vehicle body 16 is provided with a traveling driving device (not shown) such as an engine that drives the rear wheel 18R, and is provided with a bar handle 20 with which the driver operates the traveling direction of the vehicle 12. The vehicle 12 turns in a desired direction by the bar handle 20 being operated or the vehicle body 16 itself being inclined by the driver.

The brake system 14 appropriately brakes the front wheel 18F and the rear wheel 18R under the control of the control device 10. This brake system 14 includes the control device 10, a front wheel brake 22F, a rear wheel brake 22R, a brake lever 24, a brake pedal 26, a first master cylinder 28 and a second master cylinder 30. And a fluid pressure system 34 of the brake fluid pressure formed of brake fluid piping 32 and the control device 10 is provided between the front wheel brake 22F and the first master cylinder 28 and between the rear wheel brake 22R and the second master cylinder 30.

The front wheel brake 22F is provided with a front wheel disk 36F attached to the front wheel 18F to rotate together with the front wheel 18F and a front wheel caliper 38F that causes a pad (not shown) sandwiching the front wheel disk 36F by the brake fluid pressure to proceed and recede. Likewise, the rear wheel brake 22R is provided with a rear wheel disk 36R attached to the rear wheel 18R to rotate together with the rear wheel 18R and a rear wheel caliper 38R that causes a pad (not shown) sandwiching the rear wheel disk 36R by the brake fluid pressure to proceed and recede.

The brake lever 24 is provided on one side (right side in FIG. 1) of the bar handle 20, and is connected to the first master cylinder 28 attached to the bar handle 20 similarly. The first master cylinder 28 applies to the fluid pressure system 34 a brake fluid pressure responsive to the operation force of the brake lever 24 by the driver.

The brake pedal 26 is provided in a predetermined position of the vehicle body 16, and is connected to the second master cylinder 30 attached to the vehicle body 16. The second master cylinder 30 applies to the fluid pressure system 34 a brake fluid pressure responsive to the pressing operation force of the brake pedal 26 by the driver.

The piping 32 of the fluid pressure system 34 includes first piping 32F1 connecting between the first master cylinder 28 and the control device 10, front wheel brake piping 32F2 between the control device 10 and the front wheel brake 22F, second piping 32R1 connecting between the second master cylinder 30 and the control device 10, and rear wheel brake piping 32R2 connecting between the control device 10 and the rear wheel brake 22R.

The control device 10 is provided with a fluid pressure unit 42 and an ECU (electric control unit) 44 that controls the fluid pressure unit 42. Inside the fluid pressure unit 42, a fluid passage 40 constituting the fluid pressure system 34 by brake fluid channels and various parts is provided. To the input port and the output port of the fluid pressure unit 42, the first piping 32F1, the front wheel brake piping 32F2, the second piping 32R1 and the rear wheel brake piping 32R2 are connected.

Figure 2:
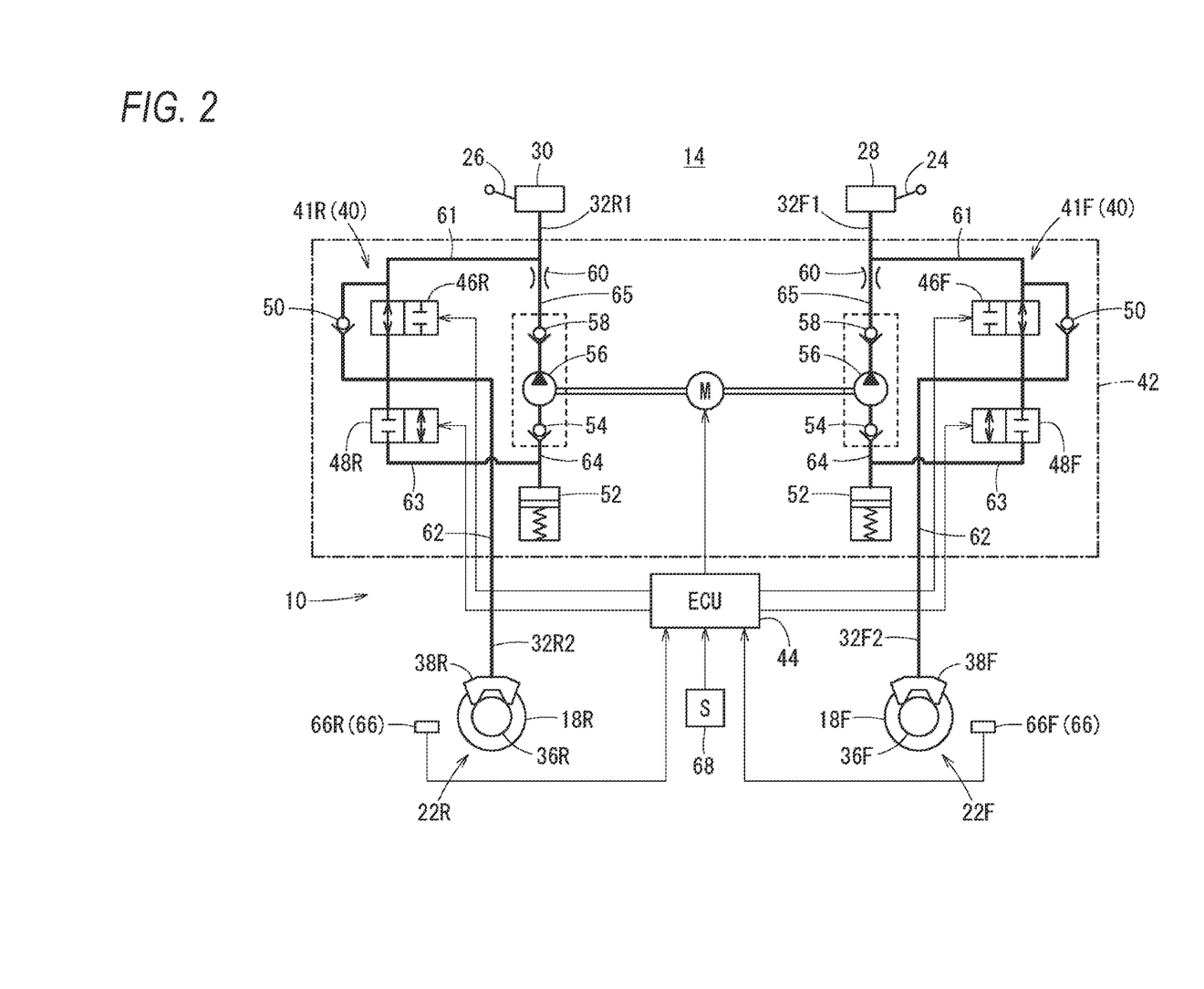
FIG. 2 is a circuit diagram of a fluid pressure circuit of the brake control device for vehicles with bar handle.

As shown in FIG. 2, the fluid passage 40 is provided with a front wheel brake channel 41F making the first piping 32F1 and the front wheel brake piping 32F2 communicate with each other and a rear wheel brake channel 41R making the second piping 32R1 and the rear wheel brake piping 32R2 communicate with each other. The front wheel brake channel 41F and the rear wheel brake channel 41R are basically formed so as to be the same, and in the following description, the structure of the front wheel brake channel 41F will be described representatively.

In appropriate positions of the front wheel brake channel 41F, an inlet valve 46F (an inlet valve 46R on the rear wheel brake channel 41R), an outlet valve 48F (an outlet valve 48R on the rear wheel brake channel 41R), a check valve 50, a reservoir 52, a suction valve 54, a pump 56, a discharge valve 58, an orifice 60 and the like are provided. Moreover, the front wheel brake channel 41F has five fluid channels 61, 62, 63, 64 and 65.

To lead the brake fluid pressure to the inlet valve 46F, the channel 61 establishes communication from the input port to which the first piping 32F1 on the side of the first master cylinder 28 is connected, to one end of the inlet valve 46F.

The channel 62 establishes communication from the other end of the inlet valve 46F to the outlet port to which the front wheel brake piping 32F2 on the side of the front wheel caliper 38F is connected.

The channel 63 establishes communication from the channel 61 to the reservoir 52. The channel 63 is provided with the outlet valve 48F.

The channel 64 establishes communication from the reservoir 52 to the suction side of the pump 56. The channel 65 establishes communication from the discharge side of the pump 56 to the channel 61. The channel 65 is provided with the orifice 60.

The inlet valve 46F is a normally open electromagnetic valve, and is provided between the first master cylinder 28 and the front wheel caliper 38F (between the channel 61 and the channel 62). The inlet valve 46F allows the transmission of the brake fluid pressure from the first master cylinder 28 to the front wheel caliper 38F by being open when the ABS control (fluid pressure control) is inactive. On the other hand, the inlet valve 46F shuts off the brake fluid pressure applied from the brake lever 24 to the front wheel brake 22F through the first master cylinder 28 by being closed when the front wheel 18F is about to slip in the ABS control.

The outlet valve 48F is a normally closed electromagnetic valve, and is provided between the front wheel caliper 38F and the reservoir 52 (the channel 63). The outlet valve 48F, which is closed when the ABS control is inactive, makes the brake fluid pressure applied to the front wheel brake 22F escape to the reservoir 52 by being opened when the front wheel 18F is about to slip in the ABS control.

The check valve 50 is a valve that allows only the inflow of the brake fluid from the front wheel caliper 38F to the first master cylinder 28, and is connected in parallel to the inlet valve 46F. Thereby, when the input of the fluid pressure from the first master cylinder 28 is released, even if the inlet valve 46F is closed, the flow of the brake fluid from the side of the front wheel caliper 38F to the first master cylinder 28 is allowed.

The reservoir 52 stores the brake fluid that flows by the outlet valve 48F being opened. The pump 56 is provided with the suction valve 54 and the discharge valve 58, is operated by a motor M provided inside the fluid pressure unit 42, and has the function of sucking the brake fluid stored in the reservoir 52 and returning (discharging) the brake fluid to the side of the first master cylinder 28. Moreover, the orifice 60 absorbs the pulsation of the brake fluid discharged to the side of the first master cylinder 28 through the discharge valve 58.

As shown in FIGS. 1 and 2, the vehicle 12 is provided with a front wheel speed sensor 66F that detects the speed (front wheel speed FV) of the front wheel 18F and a rear wheel speed sensor 66R that detects the speed (rear wheel speed RV) of the rear wheel 18R. Hereinafter, the front wheel speed sensor 66F and the rear wheel speed sensor 66R are collectively referred to also as wheel speed sensors 66. The wheel speed sensors 66 are communicably connected to the control device 10 through communication lines 69. In FIGS. 1 and 2, the channels of the brake fluid are drawn by the thick solid lines, and the communication lines 69 that transmit signals of sensors and the like are drawn by the thin solid lines.

Further, the vehicle 12 is provided with a bank angle sensor 68 that detects a bank angle θ which is the inclined state of the vehicle 12. In the present embodiment, the bank angle sensor 68 is structured as a sensor group formed of a combination of an acceleration sensor 68a and an angular speed sensor 68b attached to the vehicle 12. The bank angle sensor 68 is not limited to this structure but a known sensor may be applied; for example, a known inclination angle sensor may be applied.

As the acceleration sensor 68a, a sensor capable of detecting an acceleration of not less than three axes is applied, and in the present embodiment, the acceleration sensor 68a has the function of detecting an acceleration applied in the horizontal direction (width direction) at least in a front view of the vehicle body 16. Moreover, as the angular speed sensor 68b, a gyroscope sensor that detects a roll angular speed and a yaw angular speed as the angular speed of the vehicle body 16 is applied. The acceleration sensor 68a and the angular speed sensor 68b are communicably connected to the control device 10 through the communication lines 69.

The ECU 44 of the brake system 14 (the control device 10) is structured as a computer (including a microcontroller) provided with a non-illustrated processor, memory and input-output interface. The ECU 44 is structured as the control unit of the present embodiment for controlling the operation of the fluid pressure unit 42 by the processor arithmetically processing a program stored in the memory. In particular, the ECU 44 performs the fluid pressure control to suppress a slip by appropriately adjusting the brake fluid pressure when it is determined that the wheel 18 is about to slip by the braking force in a state where the vehicle 12 is cornering at a curve or the like on a traveling road.

Figure 3:
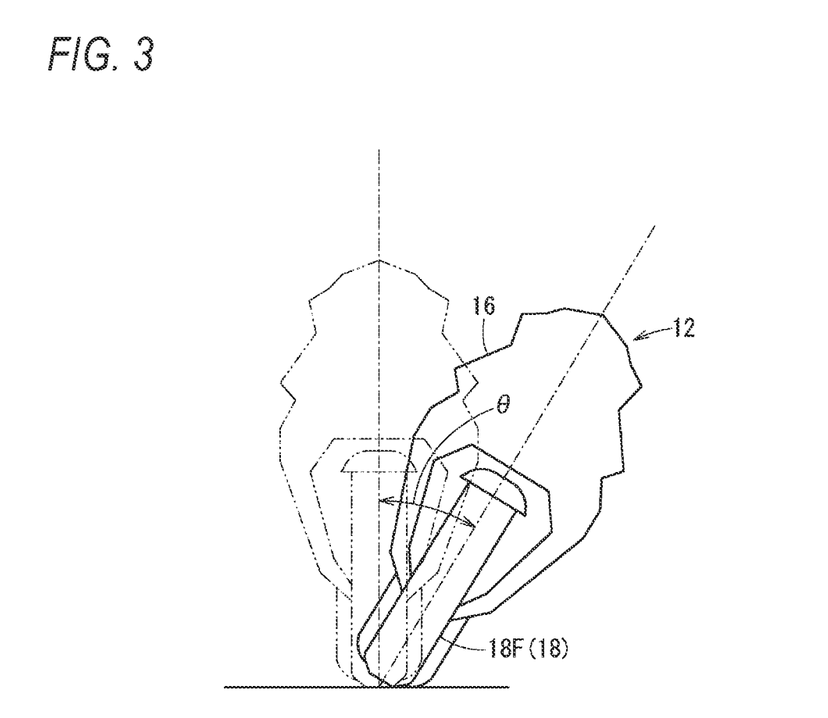
FIG. 3 is an explanation view showing the bank angle of the vehicle with bar handle.

As shown in FIG. 3, the driver inclines the attitude of the vehicle body 16 rightward or leftward when the vehicle 12 turns to the right or the left. Thereby, a force in the horizontal direction is applied to the vehicle 12 according to the bank angle θ. When the driver's braking operation is performed while the vehicle 12 is cornering, the vehicle 12 decelerates to cause a deceleration, so that a force in the front-back direction is applied in a manner so as to be combined with the force in the horizontal direction.

The ECU 44 is structured so as to suppress a slip of the wheel 18 by adjusting the brake fluid pressure when a brake operation is performed by the driver during cornering and the wheel 18 is about to slip.

Figure 4:
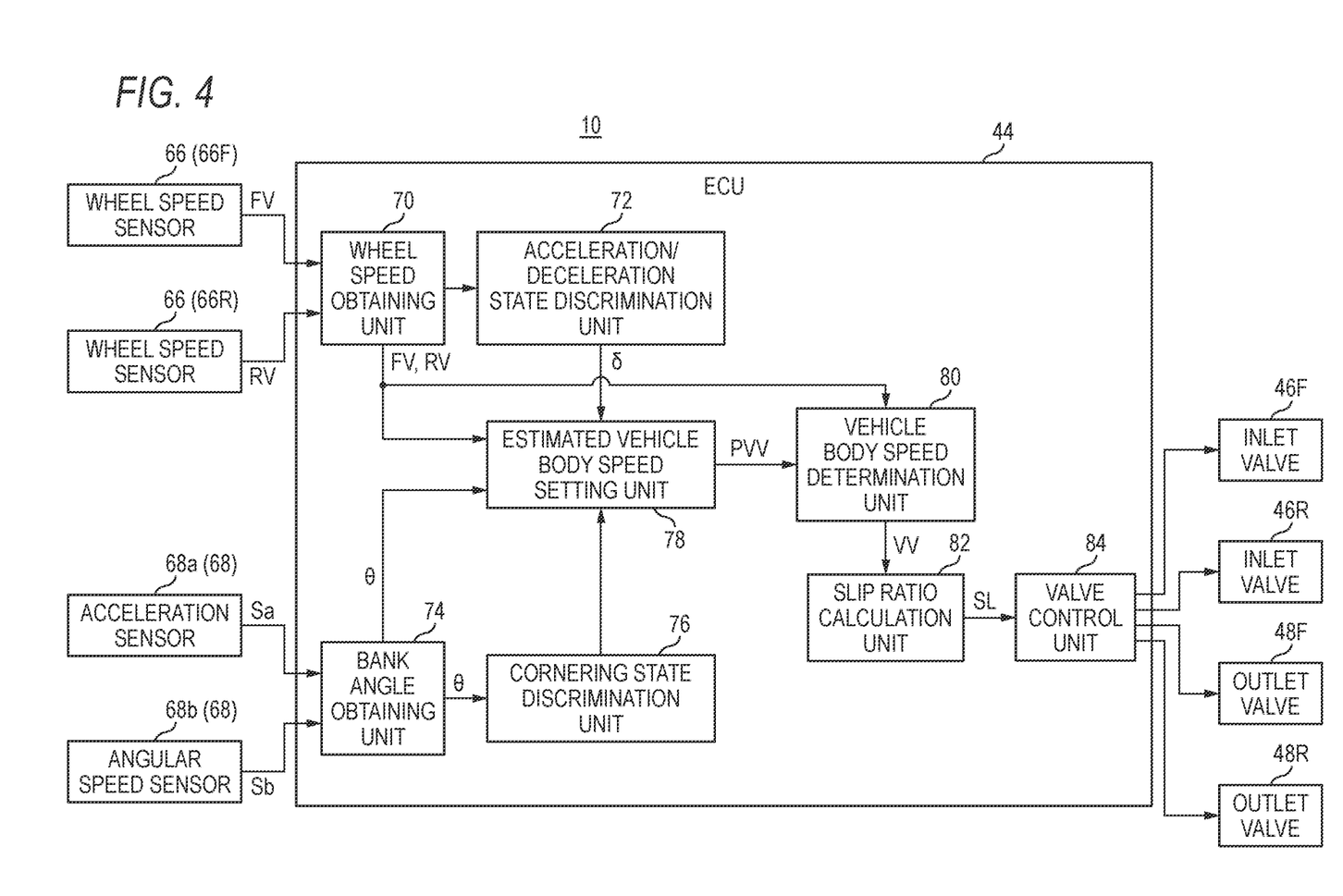
FIG. 4 is a block diagram of an ECU of the brake control device for vehicles with bar handle.

For this reason, as shown in FIG. 4, a wheel speed obtaining unit 70, an acceleration/deceleration state discrimination unit 72, a bank angle obtaining unit 74, a cornering state discrimination unit 76, an estimated vehicle body speed setting unit 78, a vehicle body speed determination unit 80, a slip ratio calculation unit 82 and a valve control unit 84 are provided inside the ECU 44. The following description of functional blocks of the ECU 44 will also be given by mainly using as an example a structure that controls the front wheel 18F.

The wheel speed obtaining unit 70 receives the detection value from the wheel speed sensor 66 (the front wheel speed sensor 66F, the rear wheel speed sensor 66R). Then, the wheel speed obtaining unit 70 temporarily stores the received detection value in the memory as information on the front wheel speed FV and the rear wheel speed RV, and outputs the front wheel speed FV and the rear wheel speed RV to the acceleration/deceleration state discrimination unit 72, the estimated vehicle body speed setting unit 78 and the slip ratio calculation unit 82.

The acceleration/deceleration state discrimination unit 72 calculates the acceleration/deceleration based on the received front wheel speed FV and rear wheel speed RV, and further, discriminates the acceleration state or the deceleration state of each wheel 18. For example, when the acceleration/deceleration is calculated from the front wheel speed FV of the front wheel 18F, two front wheel speeds FV a predetermined time interval T away from each other are used (see also FIGS. 8A and 8B). Then, by subtracting the previous front wheel speed FVn−1 from the current front wheel speed FVn, the deceleration amount δ of the front wheel speed FV is calculated. The acceleration/deceleration is calculated by the change ratio of this deceleration amount δ during the time interval T. When the wheel 18 is decelerating, the deceleration amount δ (acceleration/deceleration amount) is a negative value.

That is, the acceleration/deceleration state discrimination unit 72 discriminates the acceleration state when the acceleration/deceleration is positive, discriminates the deceleration state when the amount is negative, and notifies the estimated vehicle body speed setting unit 78 of the determination result. Moreover, when discriminating the deceleration state, the acceleration/deceleration state discrimination unit 72 outputs the calculated deceleration amount δ (or a front wheel acceleration/deceleration FA obtained from the time interval T and the deceleration amount δ) to the estimated vehicle body speed setting unit 78. Needless to say, regarding the rear wheel 18R, the acceleration/deceleration state discrimination unit 72 also discriminates the acceleration state or the deceleration state and outputs the deceleration amount δ of the rear wheel speed RV or a rear wheel acceleration RA.

Receiving a detection value Sa of the acceleration sensor 68a and a detection value Sb of the angular speed sensor 68b, the bank angle obtaining unit 74 calculates the bank angle θ which is the inclined attitude of the vehicle body 16 from these detection values Sa and Sb. In this case, the bank angle obtaining unit 74 calculates the bank angle θ by combining the acceleration applied in the horizontal direction of the vehicle 12 contained in the detection value Sa and the components of the roll angular speed and the yaw angular speed contained in the detection value Sb. Then, the bank angle obtaining unit 74 temporarily stores the calculated bank angle θ in the memory and outputs this bank angle θ to the cornering state discrimination unit 76 and the estimated vehicle body speed setting unit 78.

The cornering state discrimination unit 76 discriminates the cornering state or the straightly traveling state of the vehicle 12, or the like based on the received bank angle θ. The cornering state determination unit 76 has an angle threshold value (not shown) corresponding to the bank angle θ, and discriminates the cornering state of the vehicle 12 when the bank angle θ is larger than or equal to a predetermined angle threshold value and the state continues for a predetermined time. On the other hand, the cornering state discrimination unit 76 discriminates the straightly traveling state of the vehicle 12 when the bank angle θ is less than the predetermined angle threshold value or the state where the bank angle θ is larger than or equal to the predetermined angle threshold value is canceled immediately.

The estimated vehicle body speed setting unit 78 sets an estimated vehicle body speed PVV used when the ECU 44 controls the brake system 14 (the inlet valve 46F, the outlet valve 48F). In this case, the estimated vehicle body speed PVV includes a front wheel estimated vehicle body speed FVV estimated from the front wheel speed FV and a rear wheel estimated vehicle body speed RVV estimated from the rear wheel speed RV. For example, the estimated vehicle body speed PVV is used when a slip ratio SL is calculated at the slip ratio calculation unit 82. Hereinafter, similarly to the above description, the calculation of the front wheel estimated vehicle body speed FVV will be representatively described in detail.

The estimated vehicle body speed setting unit 78 calculates the front wheel estimated vehicle body speed FVV by using the deceleration amount δ of the front wheel 18F of the acceleration/deceleration state discrimination unit 72 and the bank angle θ while the vehicle 12 is cornering. Since the predetermined time interval T is fixed, the deceleration δ of the front wheel speed FV includes information on the previous front wheel speed FVn−1, the current front wheel speed FVn and the front wheel acceleration/deceleration FA.

Here, regarding the vehicle 12, a physical limit value DL of the deceleration (minus acceleration) exists because of the frictional force of the road surface, the grip force of the tire or the like when the wheel 18 decelerates by a brake operation. For example, when it is determined that the front wheel acceleration/deceleration FA exceeds a limit value DL of 1 G (a front wheel deceleration limit value FDL), it is preferable to estimate that the front wheel estimated vehicle body speed FVV has decreased by a change amount γ based on the front wheel deceleration limit value FDL. Thereby, when the front wheel estimated vehicle body speed FVV is estimated from the front wheel speed FV, the estimated value is a value closer to an actual vehicle body speed AVV (actual vehicle body speed).

When the vehicle 12 is in the cornering state, the physical front wheel deceleration limit value FDL of the deceleration is weaker than when the vehicle 12 is in the straightly traveling state. If the change amount γ of the front wheel deceleration limit value FDL (1 G) in the straightly traveling state is applied as it is, the accuracy of the front wheel estimated vehicle body speed FVV at the time of cornering is decreased. For this reason, the estimated vehicle body speed setting unit 78 according to the present embodiment is structured so as to correct the front wheel deceleration limit value FDL to the low deceleration (weak deceleration) side according to the bank angle θ in the cornering state of the vehicle 12.

Figure 5:
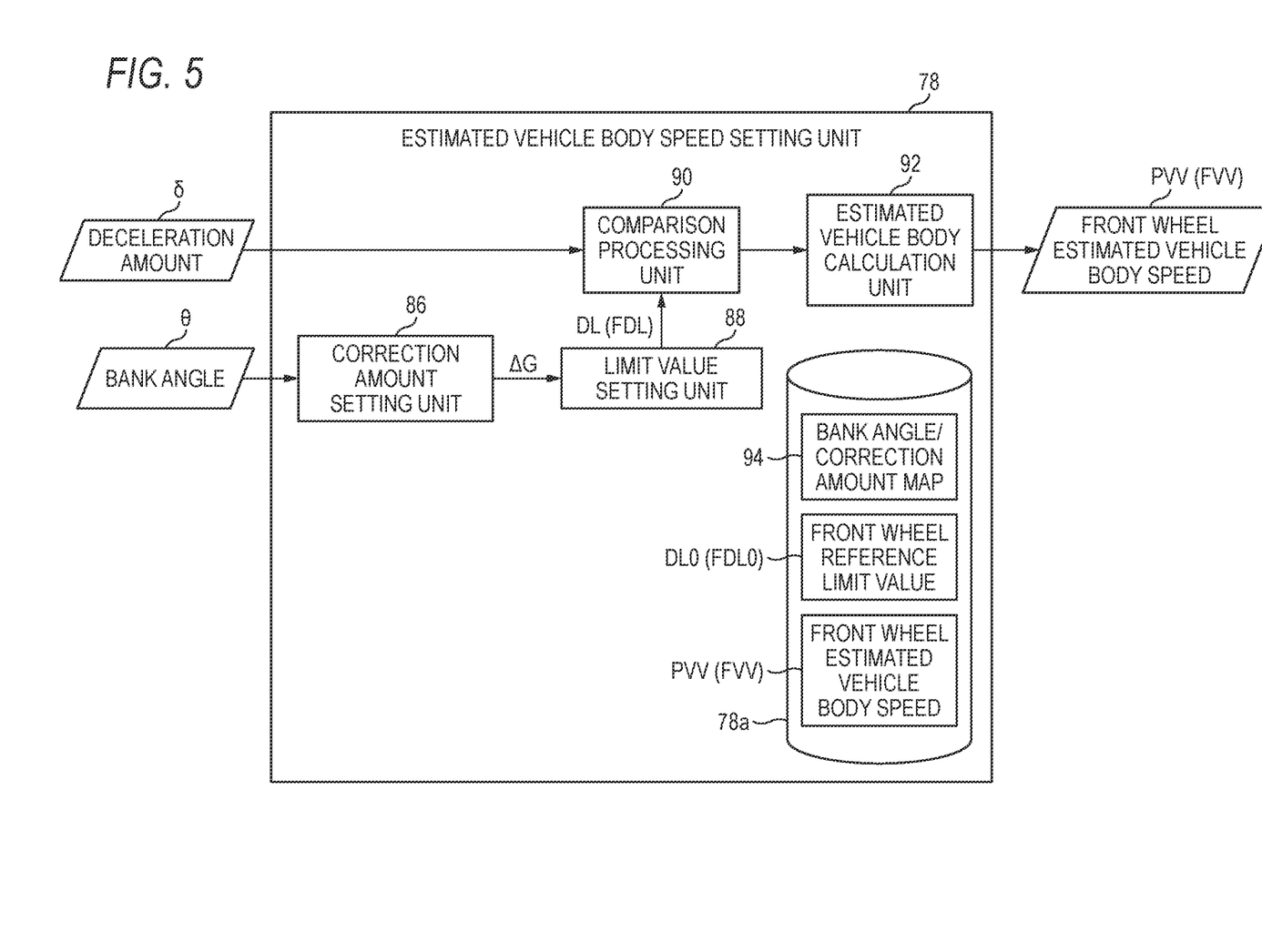
FIG. 5 is a block diagram concretely showing an estimated vehicle body speed setting unit of the ECU.

Specifically, as shown in FIG. 5, a correction amount setting unit 86, a limit value setting unit 88, a comparison processing unit 90 and an estimated vehicle body calculation unit 92 are provided inside the estimated vehicle body speed setting unit 78. Moreover, the estimated vehicle body speed setting unit 78 is provided with a storage unit 78a (storage area of the memory) where a bank angle/correction amount map 94 and a front wheel reference limit value FDL0 are prestored and the calculated front wheel estimated vehicle body speed FVV is stored.

The correction amount setting unit 86 sets a correction amount ΔG to correct a vehicle deceleration reference limit value DL0 described later to the low deceleration side, based on the bank angle θ received from the bank angle obtaining unit 74. This correction amount ΔG is set by the value (positive value) of the acceleration corresponding to the deceleration (negative value) of the front wheel 18F. The correction amount setting unit 86 extracts the correction amount ΔG with the bank angle θ as the argument with reference to the bank angle/correction amount map 94 read from the storage unit 78a. Then, the correction amount setting unit 86 outputs the extracted correction amount ΔG to the limit value setting unit 88.

Figure 6:
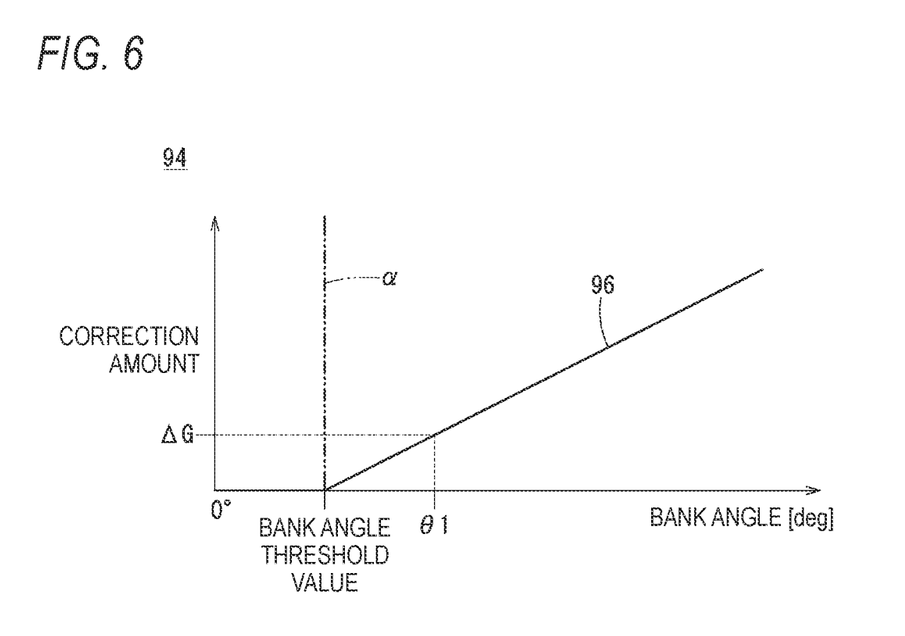
FIG. 6 is a graph showing an example of a bank angle/correction amount map according to the embodiment.

As shown in FIG. 6, the bank angle/correction amount map 94 can be shown in a graphic form with the horizontal axis as the bank angle θ and the vertical axis as the correction amount. The correction line 96 in FIG. 6 is set so that when the bank angle θ is in a range from 0 degrees to a bank angle threshold value α, the correction amount is 0 and when the bank angle θ is larger than or equal to the bank angle threshold value α, the correction amount linearly increases as the bank angle θ increases. The association function of the bank angle θ and the correction amount may be arbitrarily designed; for example, the bank angle θ and the correction amount may be associated nonlinearly (in a polynomial function) by experiment or the like.

Figure 7A:
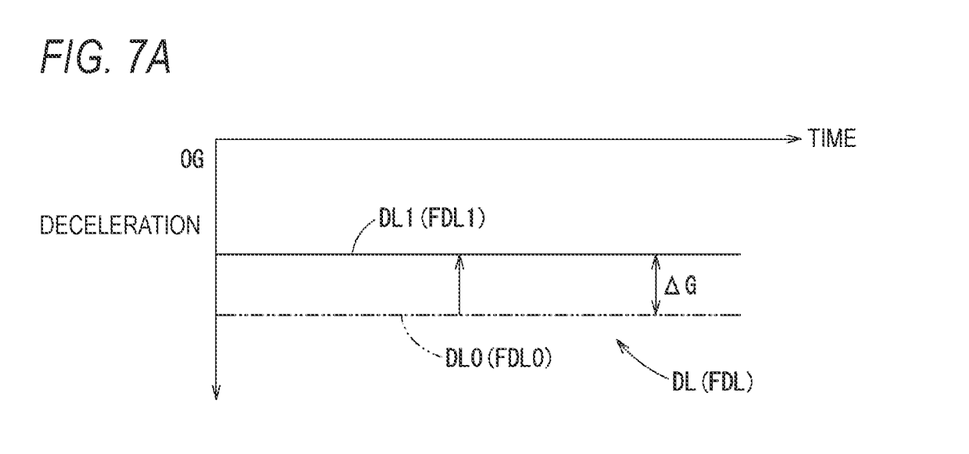
FIG. 7A is a graph explaining the correction of a front wheel reference limit value by a limit value setting unit.
Figure 7B:
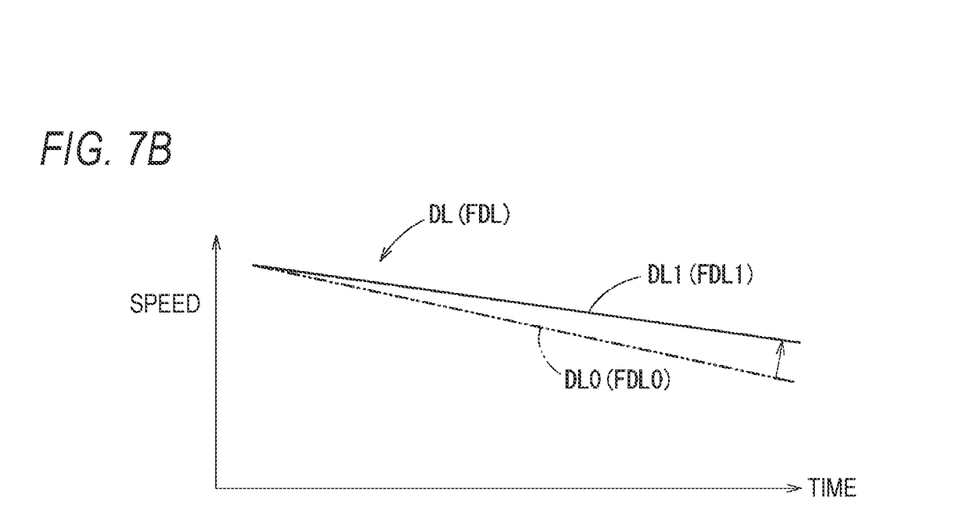
FIG. 7B is a graph explaining the difference in inclination between the front wheel reference limit value and a front wheel correction limit value.

As shown in FIGS. 5, 7A and 7B, the limit value setting unit 88 sets the physical limit value DL of the deceleration (the front wheel deceleration limit value FDL) when the front wheel 18F decelerates at the time of cornering. Receiving the correction amount ΔG from the correction amount setting unit 86, the limit value setting unit 88 calculates a correction limit value DL1 (front wheel correction limit value FDL1) by adding the correction amount ΔG to the vehicle deceleration reference limit value DL0 (front wheel reference limit value FDL0) which is a pre-correction reference value stored in the storage unit 78a. Since the front wheel reference limit value FDL0 is a negative value and the correction amount ΔG is a positive value, the front wheel deceleration limit value FDL is corrected to the low deceleration side according to the bank angle θ.

For example, by the correction amount ΔG being added to the pre-correction front wheel reference limit value FDL0, the corrected front wheel correction limit value FDL1 becomes gentle in the decrease rate of the deceleration. That is, when it is assumed that the bank angle θ is constant, in the graph shown in FIG. 7B where the horizontal axis represents time and the vertical axis represents speed, the front wheel correction limit value FDL1 is corrected so that the inclination is gentle from the front wheel reference limit value FDL0 shown by the alternate long and two short dashes line.

Returning to FIG. 5, the comparison processing unit 90 of the estimated vehicle body speed setting unit 78 compares the front wheel deceleration limit value FDL (the front wheel correction limit value FDL1, or the front wheel reference limit value FDL0 when no correction is performed) set by the limit value setting unit 88 and the deceleration amount δ of the front wheel speed FV. Then, when the deceleration amount δ is smaller than the change amount γ of the front wheel deceleration limit value FDL, the deceleration amount δ is applied as it is. On the other hand, when the deceleration amount δ of the front wheel speed FV is larger than the change amount γ of the front wheel deceleration limit value FDL, the change amount γ is applied. That is, the comparison processing unit 90 selects the one that is higher in speed from between the deceleration amount δ and the change amount γ (high select).

Moreover, the estimated vehicle body calculation unit 92 calculates the estimated vehicle body speed PVV (the front wheel estimated vehicle body speed FVV) in response to the result of the selection by the comparison processing unit 90. Specifically, the current front wheel estimated vehicle body speed FVVn is obtained by reading the previous front wheel estimated vehicle body speed FVVn−1 from the storage unit 78*a* and adding the selected deceleration amount δ or the change amount γ to the previous front wheel estimated vehicle body speed FVVn−1.

Hereinafter, referring to FIGS. 8A and 8B, the calculation of the front wheel estimated vehicle body speed FVV (the current front wheel estimated vehicle body speed FVVn) will be described in detail. The graphs of FIGS. 8A and 8B in which the horizontal axis represents time and the vertical axis represents speed show changes of the front wheel speed FV. Moreover, in FIGS. 8A and 8B, at a time point tn−1 when the previous front wheel estimated vehicle body speed FVVn−1 is calculated, the front wheel estimated vehicle body speeds FVVn−1 of both are the same value.

Figure 8A:
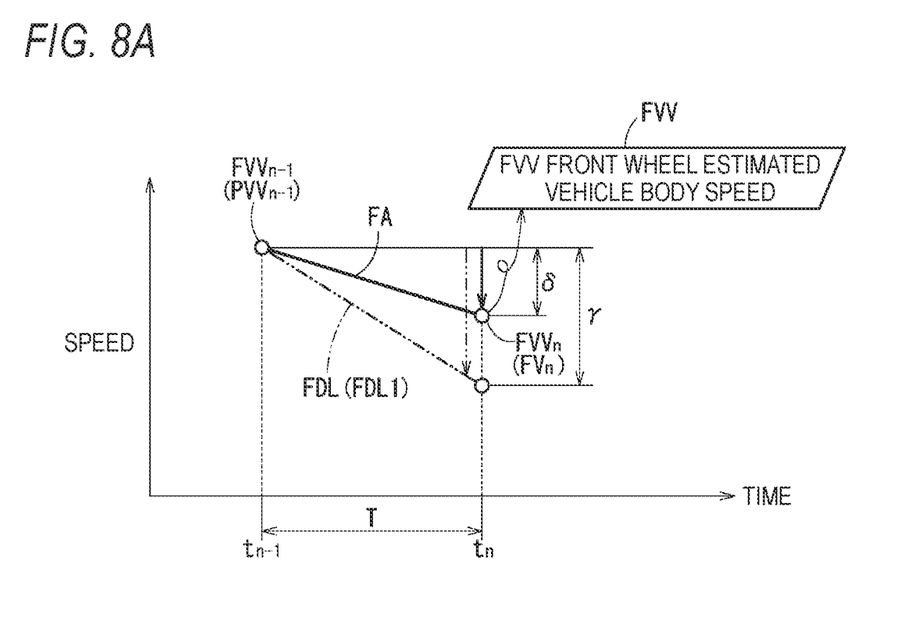
FIG. 8A is a graph explaining the calculation of a front wheel estimated vehicle body speed when the deceleration amount is smaller than the change amount.

FIG. 8A shows a case where the deceleration amount δ of the front wheel speed FV is small. That is, the absolute value of the deceleration amount δ at a time point tn when the time interval T has elapsed from the time point tn−1 is lower than the absolute value of the change amount γ of the front wheel deceleration limit value FDL (the front wheel correction limit value FDL1) set based on the bank angle θ. In other words, the front wheel acceleration/deceleration FA is lower in deceleration than the front wheel deceleration limit value FDL.

By the front wheel acceleration/deceleration FA being lower in deceleration than the front wheel deceleration limit value FDL as described above, the comparison processing unit 90 selects to calculate the current front wheel estimated vehicle body speed FVVn by using the detected deceleration amount δ. In response to this selection, the estimated vehicle body calculation unit 92 calculates the front wheel speed FVn at the time point tn (a value obtaining by adding the deceleration amount δ to the previous front wheel estimated vehicle body speed PVVn−1) as the current front wheel estimated vehicle body speed FVVn.

Figure 8B:
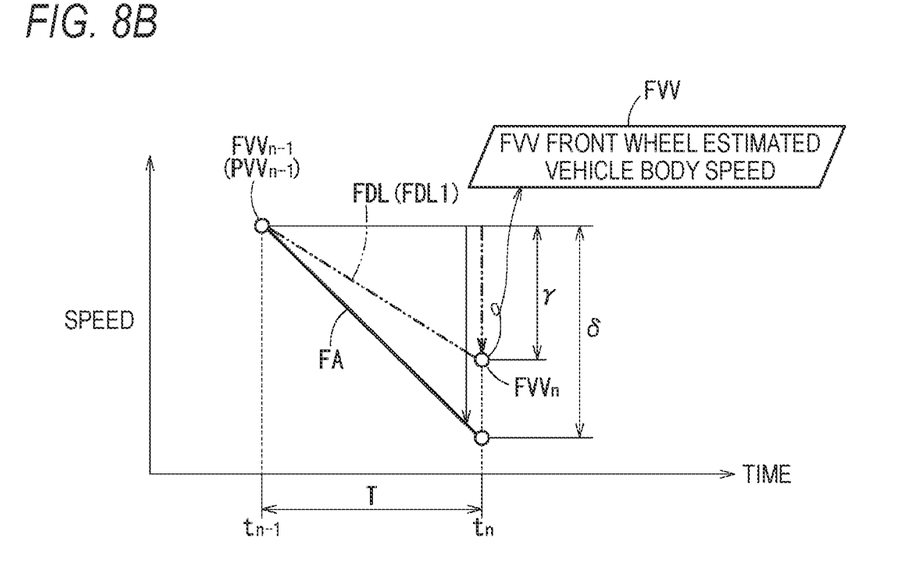
FIG. 8B is a graph explaining the calculation of the front wheel estimated vehicle body speed when the deceleration amount is larger than or equal to the change amount.

On the contrary, FIG. 8B shows a case where the deceleration amount δ of the front wheel speed FV is large. That is, the absolute value of the deceleration amount δ at the time point tn when the time point T has elapsed from the time point tn−1 is higher than the absolute value of the change amount γ of the front wheel deceleration limit value FDL (the correction limit value DL1) set based on the bank angle θ. In other words, the front wheel acceleration/deceleration FA is higher in deceleration than the front wheel deceleration limit value FDL.

When the front wheel acceleration/deceleration FA is higher in deceleration than the front wheel deceleration limit value FDL as described above, the comparison processing unit 90 selects to calculate the current front wheel estimated vehicle body speed FVVn by using the front wheel deceleration limit value FDL. In this case, the estimated vehicle body calculation unit 92 calculates, as the current front wheel estimated vehicle body speed FVVn, a value obtained by adding the change amount γ to the previous front wheel estimated vehicle body speed FVVn−1 as the speed at the time point tn.

The ECU 44 is additionally provided with the estimated vehicle body speed setting unit 78 performing similar processing also for the rear wheel speed RV of the rear wheel 18R. That is, the ECU 44 calculates the rear wheel estimated vehicle body speed RVV based on the deceleration amount δ of the rear wheel speed RV and the bank angle θ. For this reason, from each estimated vehicle body speed setting unit 78, the front wheel estimated vehicle body speed FVV and the rear wheel estimated vehicle body speed RVV are outputted.

Returning to FIG. 4, the vehicle body speed determination unit 80 of the ECU 44 determines (obtains) a vehicle body speed VV from the front wheel estimated vehicle body speed FVV and the rear wheel estimated vehicle body speed RVV. The vehicle body speed VV can be obtained by selecting a higher one of the front wheel estimated vehicle body speed FVV and the rear wheel estimated vehicle body speed RVV. Alternatively, the vehicle body speed determination unit 80 may obtain the average of the front wheel estimated vehicle body speed FVV and the rear wheel estimated vehicle body speed RVV and set it as the vehicle body speed VV. Obtaining the vehicle body speed VV, the vehicle body speed determination unit 80 outputs this vehicle body speed VV to the slip ratio calculation unit 82.

Receiving the vehicle body speed VV outputted by the vehicle body speed determination unit 80, the slip ratio calculation unit 82 calculates the slip ratio SL (FSL, RSL) of the front wheel 18F or the rear wheel 18R based on the front wheel speed FV or the rear wheel speed RV. For example, the slip ratio calculation unit 82 calculates the difference between the vehicle body speed VV and the front wheel speed FV as the slip ratio FSL of the front wheel 18F, and calculates the difference between the vehicle body speed VV and the rear wheel speed RV as the slip ratio RSL of the rear wheel 18R. Then, the slip ratio calculation unit 82 outputs the calculated slip ratio SL to the valve control unit 84.

The valve control unit 84 controls the opening and closing of the inlet valves 46F and 46R and the outlet valves 48F and 48R of the fluid pressure unit 42 based on the slip ratio SL. For example, the valve control unit 84 determines the start of pressure reduction of the ABS control based on the fact that the slip ratio FSL of the front wheel 18F is larger than or equal to a predetermined threshold value (not shown), opens the outlet valve 48F as well as closes the inlet valve 46F, and reduces the brake fluid pressure (caliper pressure) that the front wheel caliper 38F applies to the front wheel disk 36F. Then, when the caliper pressure is reduced, the valve control unit 84 closes the inlet valve 46F and the outlet valve 48F and holds the caliper pressure constant under that condition. Further, when the deceleration of the vehicle 12 is suppressed, the valve control unit 84 performs control to open the inlet valve 46F to raise the caliper pressure again.

The control device 10 according to the present embodiment is basically structured as described above, and its operation and advantage will be described below. In the following operation description, the control on the front wheel 18F will be representatively described similarly to the above.

The driver inclines the vehicle body 16 for cornering at a curve or the like on a traveling road while the vehicle 12 is traveling. Therefore, the bank angle θ of the vehicle body 16 varies during cornering. During the traveling of the vehicle 12, the bank angle obtaining unit 74 of the ECU 44 (the control device 10) shown in FIG. 4 receives the detection values Sa and Sb from the acceleration sensor 68*a* and the angular speed sensor 68*b*, and steadily calculates the bank angle θ. Moreover, the cornering state discrimination unit 76 discriminates the cornering state or the straightly traveling state of the vehicle 12 based on the result of the detection of the bank angle θ.

On the other hand, the wheel speed obtaining unit 70 of the ECU 44 receives the front wheel speed FV and the rear wheel speed RV from the front wheel speed sensor 66F and the rear wheel speed sensor 66R. With this reception, the acceleration/deceleration state discrimination unit 72 calculates the deceleration amounts δ of the front wheel speed FV and the rear wheel speed RV, and discriminates the acceleration state or the deceleration state of each wheel 18.

Moreover, the estimated vehicle body speed setting unit 78 calculates the front wheel estimated vehicle body speed FVV and the rear wheel estimated vehicle body speed RVV irrespective of the acceleration state or the deceleration state of the vehicle 12. Then, when the cornering state discrimination unit 76 discriminates the cornering state of the vehicle 12, the estimated vehicle body speed setting unit 78 calculates the front wheel estimated vehicle body speed FVV and the rear wheel estimated vehicle body speed RVV that take the bank angle θ into account.

As shown in FIG. 5, in the calculation of the front wheel estimated vehicle body speed FVV, first, the correction amount ΔG of the front wheel deceleration limit value FDL based on the bank angle θ is set by the correction amount setting unit 86. Then, at the limit value setting unit 88, the front wheel correction limit value FDL1 is calculated by adding the correction amount ΔG to the front wheel reference limit value FDL0, and outputted to the comparison processing unit 90 as the front wheel deceleration limit value FDL.

At the comparison processing unit 90, the deceleration amount δ of the front wheel speed FV (that is, the front wheel acceleration/deceleration FA) and the change amount γ of the front wheel deceleration limit value FDL are compared with each other. Then, when the absolute values of the deceleration amount δ and the change amount γ are |δ|<|γ|, the deceleration amount δ is selected, and at the estimated vehicle body calculation unit 92, the deceleration amount δ is added to the previous front wheel estimated vehicle body speed FVVn−1 to calculate the current front wheel estimated vehicle body speed FVVn. Conversely, when the absolute values of the deceleration amount δ and the change amount γ are |δ|≥|γ|, the change amount γ is selected, and at the estimated vehicle body calculation unit 92, the change amount γ is added to the previous front wheel estimated vehicle body speed FVVn−1 to calculate the current front wheel estimated vehicle body speed FVVn.

Figure 9:
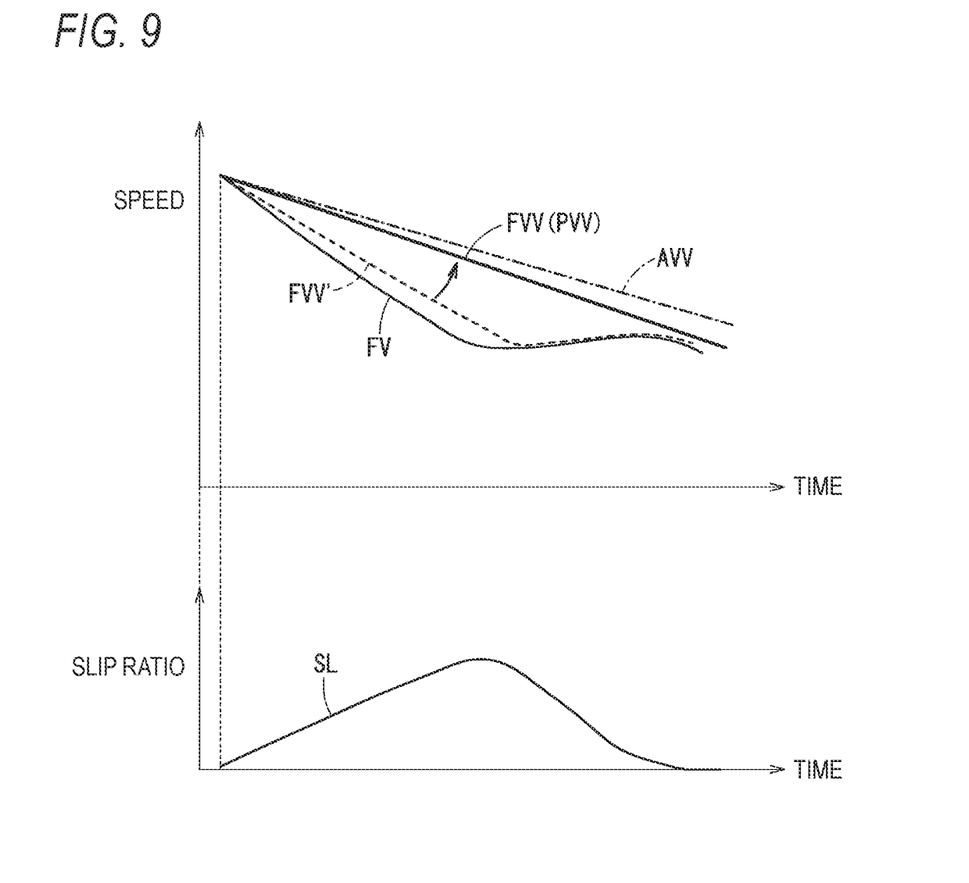
FIG. 9 is a graph showing an example of temporal changes of the front wheel speed and the front wheel estimated vehicle body speed.

Now, referring to FIG. 9, changes of the front wheel estimated vehicle body speed FVV when the front wheel speed FV is significantly decreased at the time of cornering of the vehicle 12 will be described. In FIG. 9, it is assumed that the vehicle 12 is inclined at a constant bank angle θ. In this case, the front wheel speed FV obtained by the wheel speed obtaining unit 70 significantly decreases with time by the braking of the vehicle 12 during cornering. When the front wheel speed FV is significantly decreased like this, according to the conventional method of calculating a front wheel estimated vehicle body speed FVV', the front wheel estimated vehicle body speed FVV' is obtained along the front wheel speed FV without consideration given to the bank angle θ. For this reason, as shown by the dotted line in the upper view in FIG. 9, the conventional front wheel estimated vehicle body speed FVV' is a value that changes at a significantly lower speed than the actual vehicle body speed AVV.

On the contrary, the estimated vehicle body speed setting unit 78 according to the present embodiment corrects the front wheel deceleration limit value FDL to the low deceleration side based on the bank angle θ (see FIG. 7B). For this reason, even when the decrease of the front wheel speed FV is comparatively gentle (the decrease amount is small), opportunities to select the front wheel deceleration limit value FDL (the front wheel correction limit value FDL1) in the estimated vehicle body speed setting unit 78 increase (see FIGS. 8A and 8B).

As a consequence, the front wheel estimated vehicle body speed FVV is corrected to a value closer to the actual vehicle body speed AVV than the conventional front wheel estimated vehicle body speed FVV'. The change amount γ of the front wheel deceleration limit value FDL (the front wheel correction limit value FDL1) is previously defined by experiment or the like so as not to be smaller than the decrease amount of the actual vehicle body speed AVV (|γ|>|AVV reduction amount|). Therefore, the front wheel estimated vehicle body speed FVV is calculated so that it is on the low speed side of the actual vehicle body speed AVV and further, its inclination is slightly sharper than the inclination of the vehicle body speed AVV in the upper view of FIG. 9.

The front wheel estimated vehicle body speed FVV calculated in this manner is high in the slip ratio SL obtained by subtracting the front wheel speed FV from the vehicle body speed V (the front wheel estimated vehicle body speed FVV) at the slip ratio calculation unit 82. That is, by using the front wheel estimated vehicle body speed FVV shown in the upper view of FIG. 9, the slip ratio SL comes to change in a mound shape with time as shown in the lower view of FIG. 9. For this reason, the valve control unit 84 is capable of accurately performing the ABS control according to this slip ratio SL.

The control of the rear wheel brake 22R is also performed separately from the control of the front wheel brake 22F, and processing similar to the above is performed.

As described above, the control device 10 according to the present embodiment corrects the limit value (the front wheel deceleration limit value FDL) of the deceleration of the estimated vehicle body speed PVV (the front wheel estimated vehicle body speed FVV) during cornering based on the bank angle θ. Therefore, the estimated vehicle body speed PVV can be calculated accurately. That is, since the estimated vehicle body speed setting unit 78 corrects the front wheel deceleration limit value FDL so that the change amount of the front wheel estimated vehicle body speed FVV decreases as the bank angle θ increases, when the speed of the wheel 18 is significantly decreased, this front wheel deceleration limit value FDL is set for the calculation of the front wheel estimated vehicle body speed FVV. Thereby, the front wheel estimated vehicle body speed FVV becomes a value close to the actual vehicle body speed AVV. Consequently, the calculation accuracy of the slip ratio SL calculated by using the front wheel estimated vehicle body speed FVV is improved, so that the ECU 44 can perform the fluid pressure control at an appropriate time and excellently.

Moreover, the control device 10 starts the correction of the limit value at a stage where the bank angle θ is larger than or equal to the bank angle threshold value α. Therefore, it can be suppressed that the correction of the limit value is performed at a bank angle θ in a minute operation such as a lane change. Further, in the control device 10, by increasing the correction amount ΔG of the limit value as the bank angle θ increases, when the bank angle θ is large, the limit value (the front wheel deceleration limit value FDL) is applied with a smaller deceleration amount. Thereby, the estimated vehicle body speed PVV can be made closer to the actual vehicle body speed AVV.

Further, the bank angle obtaining unit 74 can obtain a highly accurate bank angle θ by calculating the bank angle θ based on the acceleration in the horizontal direction of the vehicle 12, the roll angular speed and the yaw angular speed. Consequently, the correction of the limit value can be performed more accurately.

The present invention is not limited to the above-described embodiment and may be modified variously in accordance with the gist of the invention. For example, in the present embodiment, a structure is adopted in which the correction amount ΔG of the front wheel deceleration limit value FDL is increased as the bank angle θ increases. However, a structure may be adopted in which the correction amount ΔG of the front wheel deceleration limit value FDL changes to the low deceleration side by a predetermined correction amount when the bank angle θ exceeds the bank angle threshold value α. Alternatively, a structure may be adopted in which the correction amount ΔG of the front wheel deceleration limit value FDL stepwisely changes to the low deceleration side for each predetermined range of the bank angle θ.

According to an aspect of the invention, there is provided a brake control device for vehicles with bar handle, the brake control device comprising: a wheel speed obtaining unit which is configured to obtain a speed of a wheel of the vehicle; an estimated vehicle body speed setting unit which is configured to set an estimated vehicle body speed based on the speed of the wheel; a control unit which is configured to perform fluid pressure control to raise, reduce or hold a brake fluid pressure that acts on a wheel brake of the vehicle based on the speed of the wheel and the estimated vehicle body speed; and a bank angle obtaining unit which is configured to obtain a bank angle of the vehicle, wherein the estimated vehicle body setting unit is configured to set a limit value of a change amount when the estimated vehicle body speed decreases at a time of braking of the vehicle, and set the estimated vehicle body speed based on the limit value when a deceleration amount of the speed of the wheel on a braked side is larger than the limit value, and the estimated vehicle body speed setting unit is configured to correct the limit value so that the change amount decreases as the obtained bank angle increases.

According to the above, in the brake control device, the estimated vehicle body speed can be accurately calculated by correcting the limit value of the deceleration side of the estimated vehicle body speed during cornering based on the bank angle. That is, since the estimated vehicle body speed setting unit performs correction so that the limit value of the change amount decreases as the bank angle increases, when the speed of the wheel is significantly decreased, this limit value is made to be readily set as the estimated vehicle body speed. Thereby, the estimated vehicle body speed is a value close to the actual vehicle body speed. Therefore, for example, the calculation accuracy of the slip ratio calculated by using the estimated vehicle body speed is improved, so that the control unit can perform the fluid pressure control based on this slip ratio at an appropriate time and excellently.

The estimated vehicle body speed setting unit may not correct the limit value until the bank angle reaches a predetermined threshold value.

Thereby, the brake control device starts the correction of the limit value at a stage where the bank angle is larger than or equal to the predetermined threshold value. Therefore, it can be suppressed that the correction of the limit value is performed at a bank angle in a minute operation such as a lane change.

The estimated vehicle body speed setting unit may be configured to increase a correction amount of the limit value as the bank angle increases.

In this case, by increasing the correction amount of the limit value as the bank angle increases, when the bank angle is large, the limit value is applied even with a smaller deceleration amount. Thereby, the estimated vehicle body speed can be made closer to the actual vehicle body speed.

According to the present invention, the brake control device for vehicles with bar handle is capable of more excellently performing the fluid pressure control by accurately calculating the estimated vehicle body speed according to the bank angle at the time of cornering.

What is claimed is:

1. A brake control device for vehicles with bar handle, the brake control device comprising:
   a wheel speed obtaining unit which is configured to obtain a speed of a wheel of the vehicle;
   an estimated vehicle body speed setting unit which is configured to set an estimated vehicle body speed based on the speed of the wheel;
   a control unit which is configured to perform fluid pressure control to raise, reduce or hold a brake fluid pressure that acts on a wheel brake of the vehicle based on the speed of the wheel and the estimated vehicle body speed; and
   a bank angle obtaining unit which is configured to obtain a bank angle of the vehicle, wherein
   the estimated vehicle body speed setting unit is configured to set a limit value of a change amount of a wheel deceleration when the estimated vehicle body speed decreases at a time of braking of the vehicle, and set the estimated vehicle body speed based on the limit value when a deceleration amount of the speed of the wheel on a braked side is larger than the limit value, and
   the estimated vehicle body speed setting unit is configured to correct the limit value so that the change amount decreases as the obtained bank angle increases.

2. The brake control device according to claim 1, wherein the estimated vehicle body speed setting unit does not correct the limit value until the bank angle reaches a predetermined threshold value.

3. The brake control device according to claim 1, wherein the estimated vehicle body speed setting unit is configured to increase a correction amount of the limit value as the bank angle increases.

4. The brake control device according to claim 2, wherein the estimated vehicle body speed setting unit is configured to increase a correction amount of the limit value as the bank angle increases.

* * * * *